Patented Apr. 18, 1950

2,504,131

UNITED STATES PATENT OFFICE 2,504,131

PROCESS OF MAKING ALKALI METAL AND AMMONIUM PERMANGANATES

Theodore Jaskowiak, La Salle, Ill., assignor to Carus Chemical Company, a corporation of Illinois No Drawing. Application October 12, 1945, Serial No. 622,087

10 Claims. (Cl. 23—58)

This invention relates to a method of forming other permanganates from potassium permanganate, and more particularly to the formation of aluminum permanganate and the conversion thereof into a permanganate other than potassium.

The production of these permanganates, in pure form, with the exception of potassium permanganate, has heretofore been a matter of extreme difficulty and expense. The prior art is summarized in Wilson et al. Patent 1,544,115. In addition to the methods there suggested for the production of calcium permanganate, a disinfecting solution including aluminum permanganate is described in British Patent 10,015 of 1884, this solution being prepared by the interaction of aluminum sulfate and potassium permanganate, the resulting mixture being said to comprise aluminum permanganate and aluminum sulfate. No attempt was made to obtain an aluminum permanganate of greater purity or concentration.

I have now discovered that by proper control of reacting ingredients and reaction temperatures, potassium permanganate and aluminum sulfate, and a limited amount of water will react according to the following equation:

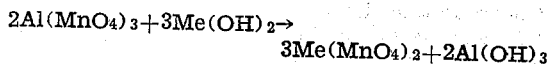

to produce a solution substantially pure and suitable for use in producing the aforementioned permanganates, while nearly all potassium will be removed as crystallized potassium aluminum sulfate. It is to be understood that only sufficient water is added to produce a concentrated solution of aluminum permanganate. Preferably this involves the addition of ingredients in the following proportions:

| | Pounds |
|---|---|
| Potassium permanganate | 172 |
| Aluminum sulfate 18 H₂O | 500 |
| Water | 500 |

In this reaction a small excess of aluminum sulfate may be used, depressing further the solubility of potassium salts and not interfering greatly with further use of the resulting solution.

Aluminum permanganate is unstable, especially at higher temperatures and the reaction mixture should preferably be maintained at all times below 80° C. Upon cooling to affect crystallization, the mass is filtered or the potassium aluminum sulfate is removed in any other suitable manner. The resulting aluminum permanganate solution is then employed to produce the desired permanganate such as, for example, calcium, sodium or zinc, by reaction with the corresponding oxide, hydroxide or carbonate. The required oxide, hydroxide, or carbonate or any admixture and/or sequence thereof, is added in water solution or in any form in suitable proportions to the aluminum permanganate solution, or the aluminum permanganate solution may be added to the oxide, etc., or the two may be added to one or the other concurrently. In the case of the more stable permanganates, as, for example, sodium and calcium, this reaction is preferably carried out at or near the boiling temperature. In the case of less stable permanganates such as ammonium permanganate, this reaction must be carried out at much lower temperatures. In general, care should be taken to use only such amounts of oxide, etc., as to react completely, without adding an excess, with the aluminum permanganate solution in accordance with the equation:

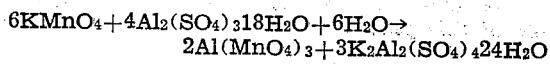

Upon completion of this reaction, the permanganate solution is separated from the precipitated solids as by filtration. The resulting solution is one of substantially the pure permanganate desired, together with small amounts of sulfate and potassium ions. This solution may be used as such or it may further be processed to yield a solution of higher concentration and greater purity or it may be processed to yield a solid crystalline product.

To obtain a solution of greater concentration and higher purity the permanganate solution is concentrated by evaporation, either at atmospheric pressure or under reduced pressure, when sulfates will crystallize out progressively as the concentration rises, these sulfates usually being the lower hydrates. As the concentration increases some potassium permanganate also crystallizes out, especially upon cooling the concentrated solution.

The maximum concentration obtainable varies with the different permanganates, depending upon their solubilities. For example, calcium permanganate may be concentrated to a content of 75% to 80% Ca(MnO₄)₂4H₂O and a specific gravity of 1.700 to 1.750 at room temperatures.

Some permanganates such as calcium and sodium being very soluble prove to be extremely difficult to crystallize in stable form; the crystals obtained, being in the hydrated form, often dissolve in their contained water of crystallization when subjected to temperatures but little higher than the usual room or atmospheric temperatures. To produce a stable permanganate such as these, in dry form, the concentrated filtered or clarified solution of such a permanganate is further evaporated at temperatures preferably below 100° C. until the water content is reduced to an amount corresponding to 4 moles water for calcium permanganate and one mole of water for sodium permanganate, at which point the solution or melt is allowed to solidify into a solid crystalline mass by suitable means such as sheeting, flaking, etc.

Other permanganates such as zinc, barium, lithium, though having a rather high solubility in water, will, after concentration, yield well definable crystals which can be separated and kept as such.

Ammonium permanganate is here considered as an alkali metal permanganate and is one of the desirable permanganates which may be produced by this process.

The invention is particularly valuable in producing alkali metal, and alkaline earth permanganates, that is those of groups I and II of the periodic system.

My copending application Serial No. 622,085 discloses and claims the preparation of zinc and magnesium permanganates. My copending application Serial No. 622,086 discloses and claims the preparation of alkaline earth metal permanganates.

Specifically the invention is applicable to the production of sodium, ammonium, and lithium permanganates in group I of the periodic system; to the production of alkaline earth permanganates such as barium, calcium and strontium permanganates; and to the production of permanganates of the sub group of group II, such as magnesium and zinc permanganates.

What I claim as new, and desire to secure by Letters Patent, is:

1. The method of forming a permanganate of the class consisting of alkali metal and ammonium permanganates, which comprises reacting a solution of aluminum permanganate with a member of the class consisting of an oxide, hydroxide and carbonate of an alkali metal, ammonium hydroxide and ammonium carbonate, at a temperature within the range extending from about 80° C. to and including the boiling point of the solution, and recovering the permanganate of said class of alkali metal and ammonium permanganates.

2. The method as set forth in claim 1 in which the member is sodium.

3. The method as set forth in claim 1 in which the member is ammonium.

4. The method of forming a permanganate of the class consisting of alkali metal and ammonium permanganates, which comprises reacting potassium permanganate and aluminum sulfate at a temperature not greater than about 80° C. and in the presence of sufficient water to produce hydrated potassium aluminum sulfate crystals and a solution of aluminum permanganate, removing the potassium aluminum sulfate from said solution, reacting said solution of aluminum permanganate with a member of the class consisting of an oxide, hydroxide and carbonate, at a temperature within the range extending from about 80° C. to and including the boiling point of the solution, and recovering the permanganate of said class of alkali metal and ammonium permanganates.

5. The method as set forth in claim 4 in which the solution of the final reaction product is concentrated so that a substantial proportion of remaining potassium containing impurity is precipitated and said impurity is removed.

6. The method as set forth in claim 4, in which the solution of the final reaction product is concentrated, so that a substantial proportion of remaining sulfate containing impurity is precipitated and said impurity is removed.

7. The method as set forth in claim 4 in which the member is sodium.

8. The method as set forth in claim 4 in which the member is lithium.

9. The method as set forth in claim 4 in which the member is ammonium.

10. The method of producing a solution of aluminum permanganate which comprises reacting potassium permanganate and aluminum sulfate at a temperature not greater than about 80° C. and in the presence of sufficient water to produce hydrated potassium aluminum sulfate crystals and a solution of aluminum permanganate, and separating the potassium aluminum sulfate from said solution.

THEODORE JASKOWIAK.

REFERENCES CITED

The following references are of record in the file of this patent:

FOREIGN PATENTS

| Number | Country | Date |
| --- | --- | --- |
| 10,015 | Great Britain | 1884 |

OTHER REFERENCES

Parkes and Mellor: "Mellor's Modern Inorganic Chemistry," Revised Ed., page 118 (1944).